Feb. 11, 1964   A. L. FREEDMAN   3,121,171
SWITCHING DEVICES
Filed Oct. 29, 1957
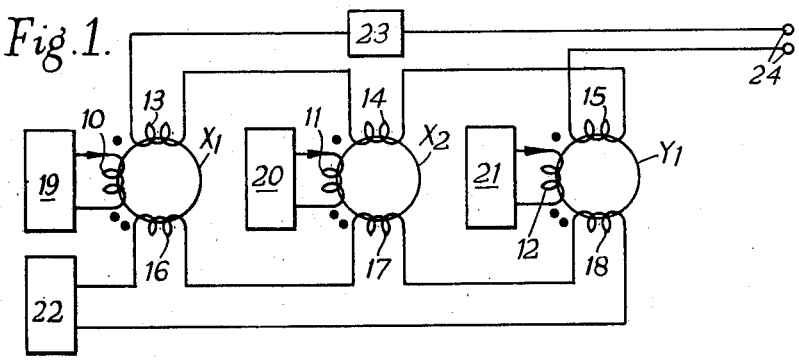
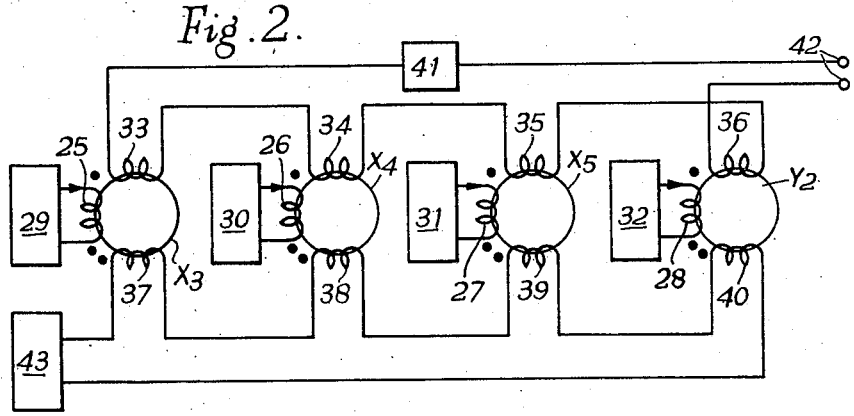
INVENTOR
ARYE LEIB FREEDMAN
BY
ATTORNEY

3,121,171
SWITCHING DEVICES
Arye Leib Freedman, Beeston, Nottingham, England, assignor to Ericsson Telephones Limited
Filed Oct. 29, 1957, Ser. No. 693,182
Claims priority, application Great Britain Oct. 29, 1956
12 Claims. (Cl. 307—88)

The present invention relates to switching devices.

A requirement sometimes arises for apparatus capable of performing the logical functions "and" or "r out of s," in response to the application thereto of operatnig pulses.

In the Proceedings of the Institute of Radio Engineers May 1955, pages 570 to 584, there is described a switching device for performing the said functions in which a ferro-magnetic core is provided with windings, hereinafter referred to as $x$ windings, to which switching pulses are applied. Further windings, hereinafter referred to as $y$ windings, are also provided on the core and further switching pulses are applied to the $y$ windings. The ferro-magnetic material used for the core is arranged to have a hysteresis curve of the shape known in the art as rectangular and the amplitude of the switching pulses is arranged to be sufficient to cause the magnetic condition of the core to be reversed. In using the device for performing logical functions in a binary system one of the magnetic conditions is referred to as "0" and the other as "1."

Normally the condition of the core corresponds to "0." The $x$ windings are made such that a switching pulse applied to any one of the $x$ windings causes the magnetic condition of the core to be changed to correspond to "1." The $y$ windings are made such that a switching pulse applied to any one thereof will restore the magnetic condition to correspond to "0" if it should be in the "1" condition. In other words the $x$ and $y$ windings produce opposite and equal effects.

Thus assuming the device to be in the "0" condition the application of switching pulses to a number of the $x$ and $y$ windings will set the device into the "1" condition only if the number of $x$ windings energised exceeds the number of $y$ windings energised.

An output winding is provided on the core for deriving an output voltage whenever the magnetic condition changes from "0" to "1."

A disadvantage of such a device is however that if the number of $x$ and $y$ windings is large, difficulty may be experienced in keeping the effects of the switching pulses sufficiently near equality to prevent erratic operation when large numbers of switching pulses are applied.

Another disadvantage is that the switching pulses have to be applied simultaneously and hence the device is unsuitable for use in systems where simultaneously-occurring pulses are not always present.

It is an object of the present invention to provide an improved switching device whereby the aforesaid disadvantages can be overcome.

According to the present invention there is provided a switching device comprising a plurality of cores, both of ferro-magnetic material having a hysteresis curve of the shape known in the art as rectangular, the cores being provided with advance windings respectively which are connected to a common control circuit adapted to set the magnetic condition of the cores to a datum, each core being provided with an associated input winding which, on the passage of current of predetermined sense and amplitude therethrough sets the associated core to an alternative magnetic condition the cores further being provided with output windings some of which are respectively connected together in series opposition to form an output circuit, the arrangement being such that, in operation, the opposing pulses produced in the output circuit when the cores respectively are returned from the said alternative condition to the datum condition are of substantially equal amplitudes. For each core the datum condition may conveniently be referred to as condition "0" and the alternative condition as condition "1."

On energisation of the advance windings a pulse appears in the output circuit only if the numbers of output windings in which pulses of one sign are generated is different from the number of output windings in which pulses of the opposite sign are generated.

The only output pulses that need be used are those occurring on energisation of the advance windings. Thus simultaneously-occurring pulses are not necessary for operating the device. Furthermore as the advance windings are supplied from a common source, it can readily be arranged that the amplitudes of the pulses in the advance windings are identical whereby the pulses appearing in the output windings can readily be made to have substantially identical amplitudes, and are independent of the amplitudes of the setting pulses applied to the input windings.

The invention will now be described by way of example with reference to the accompanying drawings, in which:

FIG. 1 is a diagrammatic representation of an "AND" gate, and

FIG. 2 is a diagrammatic representation of a "2 out of 3" gate.

The "AND" gate shown in FIG. 1 comprises three like ferro-magnetic cores $X_1$, $X_2$ and $Y_1$, of annular shape. The cores $X_1$, $X_2$ and $Y_1$ have input windings 10, 11 and 12 respectively, output windings 13, 14 and 15 respectively and advance windings 16, 17 and 18 respectively. The input windings are connected to three input circuits 19, 20 and 21 respectively and the advance windings which are substantially identical with one another are connected in series to a common source 22 of "advance" pulses. The output windings 13 and 14 on the cores $X_1$ and $X_2$ respectively are connected in series-aiding with one another, in series-opposition with the output winding 15 on the core $Y_1$ in series with a rectifier 23 to output terminals 24. The output windings are of like construction. It will usually be preferred to arrange that the input windings are identical but they need not be identical so long as they are adequate to cause reversal of the state of magnetisation of the cores in response to the applied pulses.

In operation the application of an advance pulse to the advance windings 16, 17 and 18 sets all cores in the "0" condition, and it is arranged that before each advance pulse occurs the core $Y_1$ is set to the "1" condition. This can be achieved either by applying a signal in the form of a pulse to the input winding 12 before each advance pulse or by applying a signal in the form of direct current in the input winding 12 and arranging that the advance pulse applied to the advance winding 18 is adequate to reverse the state of magnetisation of the core $Y_1$ despite the presence of direct current in the input winding 12.

If before the application of the advance pulse from the source 22 either the core $X_1$ or $X_2$ (but not both) is set to the "1" condition by the application of a pulse to the input winding 10 or 11 thereof, the pulses appearing in the output winding 15 and the output winding 13 or 14 will substantially cancel one another. If on the other hand both the cores $X_1$ and $X_2$ had been set to the "1" condition a pulse will appear at the output terminals 24 on the application of the advance pulse. The pulse appearing at the output terminals 24 will have the opposite polarity to that appearing in the output winding 15. If both the cores $X_1$ and $X_2$ are in the "0" condition on the occurrence of the advance pulse an output pulse appears at the terminals 24 of a polarity opposite to that of the last-mentioned output pulse.

Thus by suitably poling the rectifier 23 output pulses arising from the fact that both the cores $X_1$ and $X_2$ have been set in the "1" condition can be selected to the exclusion of pulses of the opposite polarity arising from the fact that both the cores $X_1$ and $X_2$ were in the "0" condition.

The "2 out of 3" gate shown in FIG. 2 comprises four cores $X_3$, $X_4$, $X_5$ and $Y_2$ provided with input windings 25, 26, 27 and 28 respectively connected to input circuits 29, 30, 31 and 32 respectively. The cores are further provided with output windings 33, 34, 35 and 36 and advance windings 37, 38, 39 and 40 respectively. The output windings 33, 34 and 35 are connected in series aiding with one another and in series opposition with the output winding 36 and in series with a rectifier 41 to output terminals 42. The advance windings are connected in series to a common source 43 of advance pulses and in operation advance pulses are applied to set the cores $X_3$, $X_4$, $X_5$ and $Y_2$ to the "0" state. Before the application of each advance pulse the core $Y_2$ is set to the "1" state, by the application either of a pulse or a direct current from the circuit 32. Input pulses applied by the circuits 29, 30 and 31 to the windings 25, 26 and 27 set the cores $X_3$, $X_4$ and $X_5$ respectively to their "1" states. If prior to the application of an advance pulse none of the cores $X_3$, $X_4$ and $X_5$ has been set to its "1" state on the application of the advance pulse an output pulse is provided in the winding 36. The rectifier 41 is so poled that this pulse is not applied to the terminals 42. If only one of the cores $X_3$, $X_4$ and $X_5$ has been set to its "1" state on the application of the advance pulse an output pulse of one sense will appear in the winding 36 and an output pulse of the opposite sense in one of the windings 33, 34 and 35 and the two output pulses will cancel each other and no output pulse will be provided at the terminals 42. If however two of the cores $X_3$, $X_4$ and $X_5$ have been set to their "1" states an output pulse of sense such that it is passed by the rectifier 41 will be provided at the terminals 42.

It will be appreciated that this embodiment of the invention uses an extension of the principle employed in the "AND" gate shown in FIG. 1, which may be regarded as a "2 out of 2" gate. In general an "$r$ out of $s$" gate (where $r$ is at least 2 and less than or equal to $s$) may be made with $s$ cores having output windings connected together in series parallel and $r-1$ cores having output windings connected together in series and in series opposition with the windings of the $s$ cores.

I claim:

1. A switching device operative in the on-off method, comprising a plurality of cores, said cores being of ferromagnetic material having a hysteresis curve of the shape known in the art as rectangular, the cores being provided with advance windings respectively, a common control circuit, means connecting said advance windings to said common control circuit, said common control circuit being for setting the magnetic condition of said cores to a datum, each core being provided with an associated input winding which, on the passage of current of predetermined sense and amplitude therethrough, sets the associated core to an alternative magnetic condition, said device further comprising an output circuit, said cores further being provided with output windings, at least two output windings of said cores being connected together in series-aiding in said output circuit and at least another of said output windings being connected together with said two last-mentioned output windings in series opposition in said output circuit, the turns ratio of said output windings being such that, on the simultaneous switching to said alternative condition of any two cores whose output windings are connected in series opposition, the output pulses in said output windings cancel.

2. A switching device according to claim 1, constituting an "$r$ out of $s$" gate, $r$ and $s$ being integers where $s$ is at least equal to $r$ and $r$ is at least 2, and comprising $(s+r-1)$ cores of the said material, each core having an advance winding connected to said common control circuit, an input winding, and an output winding connected in series in said output circuit in which $s$ of said output windings are in series aiding with each other and in series opposition with the other $(r-1)$ output windings.

3. A switching device according to claim 1, wherein said advance windings are connected in series to said common control circuit.

4. A switching device according to claim 1, wherein said advance windings are connected in parallel to said common control circuit.

5. A switching device according to claim 1, in combination with input circuits connected to said input windings respectively for setting the magnetic condition of said cores respectively to said alternative conditions.

6. A switching device according to claim 5, wherein one of said input circuits is adapted to provide a direct current signal setting the magnetic condition of its associated core to said alternative condition, said control circuit being adapted to provide a pulse in said advance winding of the said associated core of amplitude sufficient to return the magnetic condition of the core to said datum condition.

7. A switching device according to claim 2, in combination with input circuits connected to said input windings respectively for setting the magnetic condition of said cores respectively to said alternative conditions wherein the input circuits connected to the input windings of said $(r-1)$ cores having the said other $(r-1)$ output windings respectively are all adapted to provide a direct current signals setting the magnetic condition of said $(r-1)$ cores to said alternative condition, said control circuit being adapted to provide a pulse in the advance windings of said $(r-1)$ cores of amplitude sufficient to return the magnetic condition of said $(r-1)$ cores to said datum condition.

8. A switching device according to claim 1, wherein said output circuit includes a rectifier connected in series with said output windings.

9. A switching device according to claim 1, wherein said cores are of ferrite material and annular in shape.

10. A switching device constituting an "$r$ out of $s$" gate, where $r$ and $s$ are integers, $s$ being at least three and $r$ being less than $s$ and at least 2, and comprising $(s+r-1)$ cores of ferro-magnetic material having a hysteresis curve of the shape known in the art as rectangular, each core being provided with an input winding, an advance winding and an output winding, said device further comprising a common control circuit for setting all said cores to a datum state of magnetization, means connecting said advance windings to said common control circuit and output circuit in which said output windings are connected in series, $s$ of said output windings being in series aiding with each other and in series opposition with the other $(r-1)$ output windings.

11. A magnetic switching device operative as an on-off type "$r$ out of $s$" gate, where $r$ and $s$ are integers, $s$ being at least 2 and $r$ being at the most equal to $s$ and at least 2, comprising a plurality of cores, said cores being of ferro-magnetic material having a hysteresis curve of the shape known in the art as rectangular, the cores being provided with advance windings respectively, a common control circuit, means connecting said advance windings to said common control circuit for simultaneous energization therefrom for setting the magnetic condition of each said cores to a predetermined state, each said core being provided with a respective input winding and means connected to each input winding for setting the magnetic condition of the respective core only to an alternative state, said device further comprising an output circuit including one winding only for each respective core, the output windings of said cores being connected together in said output circuit, at least two of said output windings being connected in series-aiding in said output circuit and at least one further output winding being connected in series-opposition with said two last-mentioned output windings in said output circuit.

12. A switching device constituting an "$r$ out of $s$" gate, where $r$ and $s$ are integers, $s$ being at least 2 and $r$ being not greater than $s$ and at least 2, and comprising $(s+r-1)$ cores of ferro-magnetic material having a hysteresis curve of the shape known in the art as rectangular, each core being provided with an input winding, an advance winding and an output winding, said device further comprising a common control circuit for setting all said cores to a datum state of magnetization, means connecting said advance windings to said common control circuit and an output circuit in which said output windings are connected in series, $s$ of said output windings being in series-aiding with each other and in series-opposition with the other $(r-1)$ output windings.

References Cited in the file of this patent

UNITED STATES PATENTS

| | | |
|---|---|---|
| 2,652,501 | Wilson | Sept. 15, 1953 |
| 2,666,151 | Rajchman et al. | Jan. 12, 1954 |
| 2,683,819 | Rey | July 14, 1954 |
| 2,695,993 | Haynes | Nov. 30, 1954 |
| 2,729,807 | Paivinen | Jan. 3, 1956 |
| 2,742,632 | Whitley | Apr. 17, 1956 |
| 2,781,504 | Canepa | Feb. 13, 1957 |
| 2,801,344 | Lubkin | July 30, 1957 |

OTHER REFERENCES

Pub.: Thesis on Magnetic Cores by M. K. Haynes, Dec. 28, 1950, pp. 21–28, 36–45, #6.

Pub. II: "Testing Magnetic Elements," by Goodell from Electronics, January 1954, pp. 200–203, #31A.